(No Model.)

T. J. DORSEY & M. S. McQUARRIE.
SPITTOON.

No. 319,468. Patented June 9, 1885.

WITNESSES
C. M. Dashiell
E. G. Siggers

Timothy J. Dorsey.
M. S. McQuarrie.
INVENTORS

By C. A. Snow & Co.
Attorneys

UNITED STATES PATENT OFFICE.

TIMOTHY JOHN DORSEY AND MALCOLM STEAURT McQUARRIE, OF WALLA WALLA, WASHINGTON TERRITORY.

SPITTOON.

SPECIFICATION forming part of Letters Patent No. 319,468, dated June 9, 1885.

Application filed November 26, 1884. (No model.)

*To all whom it may concern:*

Be it known that we, TIMOTHY J. DORSEY and MALCOLM S. McQUARRIE, citizens of the United States, residing at Walla Walla, in the county of Walla Walla, Washington Territory, have invented a new and useful Improvement in Spittoons, of which the following is a specification, reference being had to the accompanying drawings.

Our invention relates to spittoons; and it has for its object to provide articles of this class with a removable pan or casing, whereby the same may be readily cleaned.

A further object of the invention is to provide improved means for holding said pan or casing in place and to prevent its accidental detachment or displacement.

With these ends in view the invention consists in the combination, with an outer casing, of a removable pan or inner casing.

The invention further consists in the combination, with such inner pan or casing, of a spring attached thereto and adapted to engage a slot in the outer casing, to hold said pan in position.

The invention further consists in the improved construction and combinations of parts hereinafter fully described, and pointed out in the claims.

Figure 1:
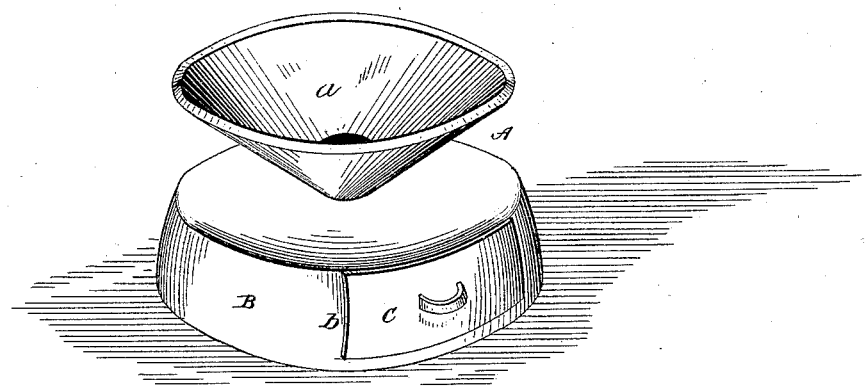
Figure 2:
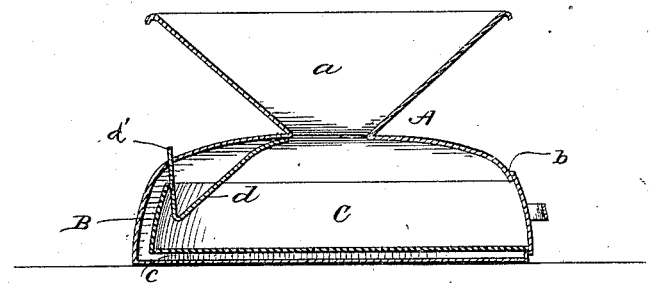
Figure 3:
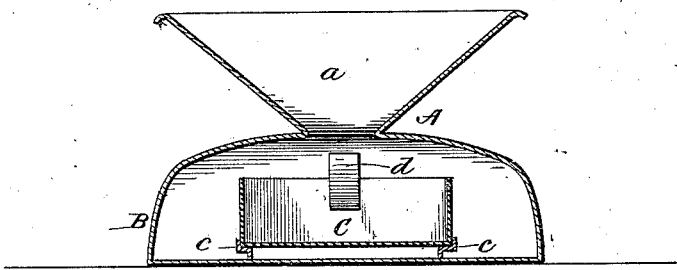

In the drawings, Figure 1 is a perspective view of a spittoon constructed in accordance with our invention. Fig. 2 is a cross-section taken longitudinally through the inner casing, and showing the catch for holding said inner casing in position; and Fig. 3 is a section taken transversely through the inner casing.

In the accompanying drawings, in which like letters of reference indicate corresponding parts in all the figures, A represents a spittoon constructed in accordance with our invention.

B represents the outer casing of the spittoon, which is provided with the usual flaring mouthpiece, a, and is of any ordinary or well-known form. This outer casing, B, is provided on its side wall at any suitable point with an elongated opening, b, to permit the insertion and withdrawal of the inner casing, as will be more fully explained.

Within the outer casing, upon the bottom or floor thereof, are arranged guides c, which extend from each end of the opening b in a parallel line to the opposite side of the casing.

C represents the inner casing or pan, which has round ends, as shown, to conform to the shape of the spittoon. The front wall of the pan or inner casing extends beyond the sides thereof, thus forming stops to limit the insertion of said pan within the outer casing farther than is necessary.

Secured to the inner side of the outer casing, adjacent to the mouth or opening of the same, is a spring-catch, d, which extends downwardly from its point of attachment, and is then bent upwardly, as shown, to form a finger-piece, d', which extends through a slot in the outer casing. When the inner casing or pan is within the outer casing, the spring bears against the inner side of the rear end thereof and holds the pan in place. To remove the pan, the spring is raised to clear the same by means of the finger-piece d'.

It will be seen that by the use of our invention, when the inner casing is to be cleaned, it may be easily removed for that purpose; also, that a spittoon constructed as above described may be manufactured and supplied at a slight cost.

Having fully described our invention, what we claim as new, and desire to secure by Letters Patent, is—

1. In a spittoon, the combination, with an outer casing, of a removable pan and a catch secured to the inner side of the outer casing, and adapted to engage the rear end of the inner casing, as set forth.

2. In a spittoon, the combination, with an outer casing, of a removable pan, stops on said pan adapted to bear against the outer side of the outer casing, and a catch secured to the inner side of the outer casing and engaging the rear end of the inner casing, as set forth.

3. In a spittoon, the combination, with an outer casing, of a removable pan, guides located on the bottom of the outer casing, and a catch secured to the inner side of the outer casing, and adapted to engage the inner end of the inner casing, as set forth.

4. In a spittoon, the combination, with an outer casing, of a removable pan, guides located on the bottom of the casing, and stops located at the outer end of the pan, as set forth.

5. In a spittoon, the combination, with an outer casing, of a removable pan having rounded ends, and a catch secured to the rear wall of said pan, and adapted to engage a slot in the outer casing, as set forth.

6. In a spittoon, the combination, with an outer casing, of a removable pan having rounded ends or walls, the front wall extending beyond the sides, and a catch on the rear wall of said pan, said catch being adapted to engage a slot in the outer casing, substantially as set forth.

7. In a spittoon, the combination, with an outer casing having an elongated opening and guides arranged upon the floor of said outer casing, of a removable pan and a catch, substantially as set forth.

In testimony that we claim the foregoing as our own we have hereto affixed our signatures in presence of two witnesses.

TIMOTHY JOHN DORSEY.
MALCOLM STEAURT McQUARRIE.

Witnesses:
EDMUND BOWDEN,
JOHN A. TAYLOR.